(12) United States Patent
Nakai (10) Patent No.: US 10,882,473 B2
(45) Date of Patent: Jan. 5, 2021

(54) GROMMET AND WIRE HARNESS (71) Applicant: SUMITOMO WIRING SYSTEMS, LTD., Mie (JP)

(72) Inventor: Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/690,554

(22) Filed: Nov. 21, 2019

(65) Prior Publication Data

US 2020/0231102 A1    Jul. 23, 2020

(30) Foreign Application Priority Data

Jan. 21, 2019 (JP) ................................ 2019-007652

(51) Int. Cl.
*B60R 16/02* (2006.01)
*H02G 3/04* (2006.01)

(52) U.S. Cl.
CPC ....... *B60R 16/0222* (2013.01); *H02G 3/0468* (2013.01)

(58) Field of Classification Search
None
See application file for complete search history.

(56) References Cited

U.S. PATENT DOCUMENTS

| | | | | |
|---|---|---|---|---|
| 4,675,937 A * | 6/1987 | Mitomi | ................ | F16B 9/00 16/2.1 |
| 4,685,173 A * | 8/1987 | Pavur | ................ | B60R 16/0222 16/2.2 |
| 4,797,513 A * | 1/1989 | Ono | ................ | H02G 3/088 16/2.2 |
| 5,453,579 A * | 9/1995 | Cohea | ................ | H02G 3/083 16/2.1 |
| 5,635,678 A * | 6/1997 | Yasukuni | ................ | H02G 3/088 156/48 |
| 5,739,475 A * | 4/1998 | Fujisawa | ................ | B60R 16/0222 174/153 G |
| 5,856,635 A * | 1/1999 | Fujisawa | ................ | B60R 16/0222 16/2.1 |
| 6,051,789 A * | 4/2000 | Kato | ................ | B60R 16/0215 174/68.3 |
| 6,081,964 A * | 7/2000 | Mori | ................ | B60R 16/0222 16/2.2 |

(Continued)

FOREIGN PATENT DOCUMENTS

JP        2015-042023 A        3/2015

*Primary Examiner* — Jenny L Wagner
*Assistant Examiner* — Muhammed Azam
(74) *Attorney, Agent, or Firm* — Oliff PLC (57) ABSTRACT

A grommet includes a tube; and a flange that has a greater diameter than the tube, the flange having an inner end that is located on an inner side in a radial direction and that is coupled to one end of the tube, wherein: the inner end of the flange is formed so as to bulge outward in a radial direction relative to an outer circumferential surface of the tube, and has an outer surface that faces toward the tube and an inner circumferential surface that is located on the opposite side of the outer surface, and faces toward an internal space of the flange, and a connection between the one end of the tube and the inner end of the flange is provided with a recess that is recessed in a direction from the outer surface of the inner end to the inner circumferential surface of the inner end.

10 Claims, 10 Drawing Sheets

(56) References Cited

U.S. PATENT DOCUMENTS

| | | | | |
|---|---|---|---|---|
| 6,339,196 B1* | 1/2002 | Uchida | ............... | B60R 16/0222 16/2.1 |
| 6,353,185 B1* | 3/2002 | Sakata | .................... | H02G 3/18 16/2.1 |
| 6,495,767 B2* | 12/2002 | Okuhara | ............ | B60R 16/0222 16/2.1 |
| 6,541,703 B2* | 4/2003 | Nakata | .................... | B60R 13/07 16/2.1 |
| 6,603,078 B2* | 8/2003 | Okuhara | ............ | B60R 16/0222 16/2.1 |
| 6,675,439 B2* | 1/2004 | Hashimoto | ......... | B60R 16/0222 16/2.1 |
| 6,901,627 B2* | 6/2005 | Uchida | ................ | H02G 3/0616 16/2.1 |
| 8,502,079 B2* | 8/2013 | Shitamichi | ......... | B60R 16/0222 16/2.1 |
| 9,315,163 B2* | 4/2016 | Nagayasu | ........... | H02G 3/0691 |
| 9,698,583 B1* | 7/2017 | Matsumura | ............ | H02G 3/088 |
| 2004/0154819 A1* | 8/2004 | Sakata | ............ | B60R 16/0222 174/650 |
| 2004/0206538 A1* | 10/2004 | Okuhara | ............ | B60R 16/0222 174/650 |
| 2007/0124923 A1* | 6/2007 | Kogure | ................. | H02G 11/00 29/749 |
| 2011/0073351 A1* | 3/2011 | Okuhara | ............ | B60R 16/0222 174/152 G |
| 2012/0261184 A1* | 10/2012 | Kitamura | ............ | B60R 16/0215 174/72 A |
| 2013/0008693 A1* | 1/2013 | Okuhara | ............ | B60R 16/0222 174/152 G |
| 2013/0084728 A1* | 4/2013 | Omae | .................... | H01R 4/646 439/271 |
| 2013/0199823 A1* | 8/2013 | Kanai (Popovici) | ........................ | H02G 3/0468 174/152 G |
| 2015/0008013 A1* | 1/2015 | Nakai | .................. | H02G 3/0691 174/135 |
| 2015/0101842 A1* | 4/2015 | Han | .................... | B60R 16/0222 174/50.57 |
| 2016/0126709 A1* | 5/2016 | Maeda | ................. | H02G 3/0462 174/68.3 |
| 2016/0172082 A1* | 6/2016 | Murata | .................... | H01B 3/28 174/84 R |
| 2016/0181776 A1* | 6/2016 | Tsukamoto | .......... | H02G 3/0468 174/68.3 |
| 2017/0148546 A1* | 5/2017 | Nakai | .................. | H01B 7/0009 |
| 2017/0179703 A1* | 6/2017 | Kominato | ................ | H01B 3/28 |
| 2017/0246999 A1* | 8/2017 | Nakagawa | .......... | B60R 16/0222 |
| 2018/0079374 A1* | 3/2018 | Nakai | .................. | B60R 16/0222 |
| 2018/0138676 A1* | 5/2018 | Yabashi | ............... | H02G 3/0406 |
| 2018/0265018 A1* | 9/2018 | Yabashi | .............. | B60R 16/0222 |
| 2019/0045678 A1* | 2/2019 | Ito | ........................ | H05K 9/0098 |

* cited by examiner

GROMMET AND WIRE HARNESS

BACKGROUND

The present disclosure relates to a grommet and a wire harness.

Conventionally, a wire harness that is to be inserted into a through hole formed in a panel of a vehicle body, and to be electrically connected to an electrical device or the like in the vehicle, is known as a wire harness that is to be routed in a vehicle or the like. This type of wire harness is provided with a grommet for blocking water from entering a through hole in a panel of a vehicle body (e.g. see JP 2015-42023A).

Figure 10:
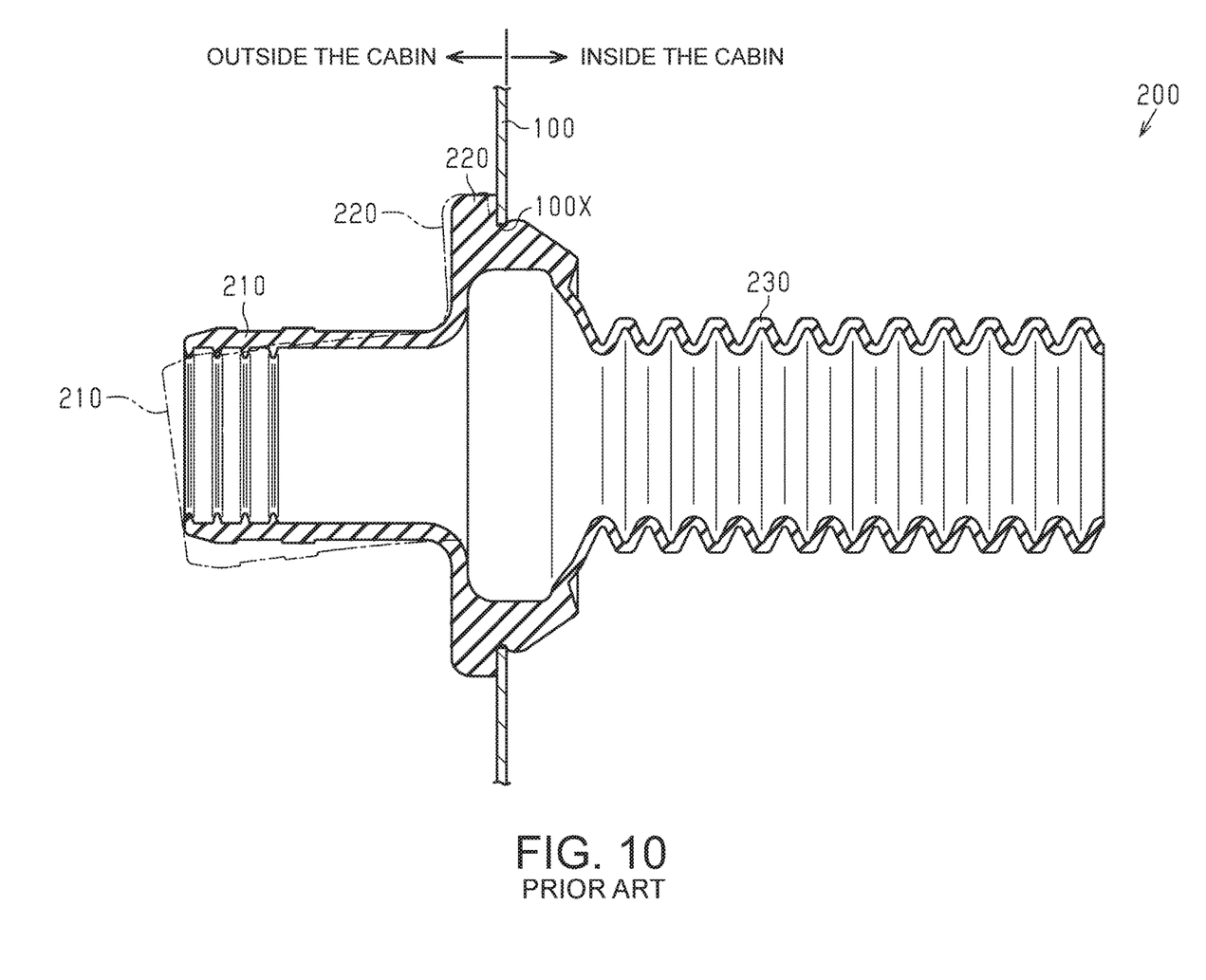
FIG. 10 is a schematic cross-sectional view showing a conventional grommet.

As shown in FIG. 10, a conventional grommet 200 includes a tube portion 210, a flange portion 220 that is formed so as to bulge outward in a radial direction relative to the tube portion 210, and a tube portion 230 that is formed so as to have a smaller outer diameter than the flange portion 220, and these portions are continuous. The conventional grommet 200 is attached to a through hole 100X that is formed in a panel 100 that separates a space outside the cabin and a space inside the cabin from each other, for example. In a state where the grommet 200 is attached to the through hole 100X, the flange portion 220 is fitted into the through hole 100X, and the flange portion 220 elastically abuts against the panel 100 in intimate contact therewith. Also, in a state where the grommet 200 is attached to the through hole 100X, the tube portion 210 is located outside the cabin, and the tube portion 230 is located in the cabin.

In the grommet 200, the flexural rigidity of a portion that faces the space outside the cabin, of the flange portion 220, is increased, and thus it is possible to prevent a gap from being formed between the flange portion 220 and the panel 100, even if the tube portion 230 is bent.

SUMMARY

However, in the grommet 200, as indicated by a dash-dot line in the drawing, when the tube portion 210 located outside the cabin is bent in a given direction, a portion that faces the space outside the cabin, of the flange portion 220, may deform according to such bending. If the flange portion 220 deforms, a gap may be formed between the flange portion 220 and the panel 100. If a gap is formed between the flange portion 220 and the panel 100, there is the possibility of water entering from the gap, and there is the problem of degradation in waterproof properties.

An exemplary aspect of the disclosure provides a grommet and a wire harness with which degradation in waterproof properties is suppressed.

A grommet according to an exemplary aspect includes: a tube; and a flange that has a greater diameter than the tube, the flange having an inner end that is located on an inner side in a radial direction and that is coupled to one end of the tube, wherein: the inner end of the flange is formed so as to bulge outward in a radial direction relative to an outer circumferential surface of the tube, and has an outer surface that faces toward the tube and an inner circumferential surface that is located on the opposite side of the outer surface, and faces toward an internal space of the flange, and a connection between the one end of the tube and the inner end of the flange is provided with a recess that is recessed in a direction from the outer surface of the inner end to the inner circumferential surface of the inner end.

The grommet according to one aspect of the present disclosure achieves the effect of preventing degradation in waterproof properties.

DETAILED DESCRIPTION OF EMBODIMENTS

The following describes an embodiment with reference to the accompanying drawings.

For the sake of illustration, the accompanying drawings may be partially exaggerated or simplified. Also, the dimensions of the components are not necessarily to scale.

Figure 1:
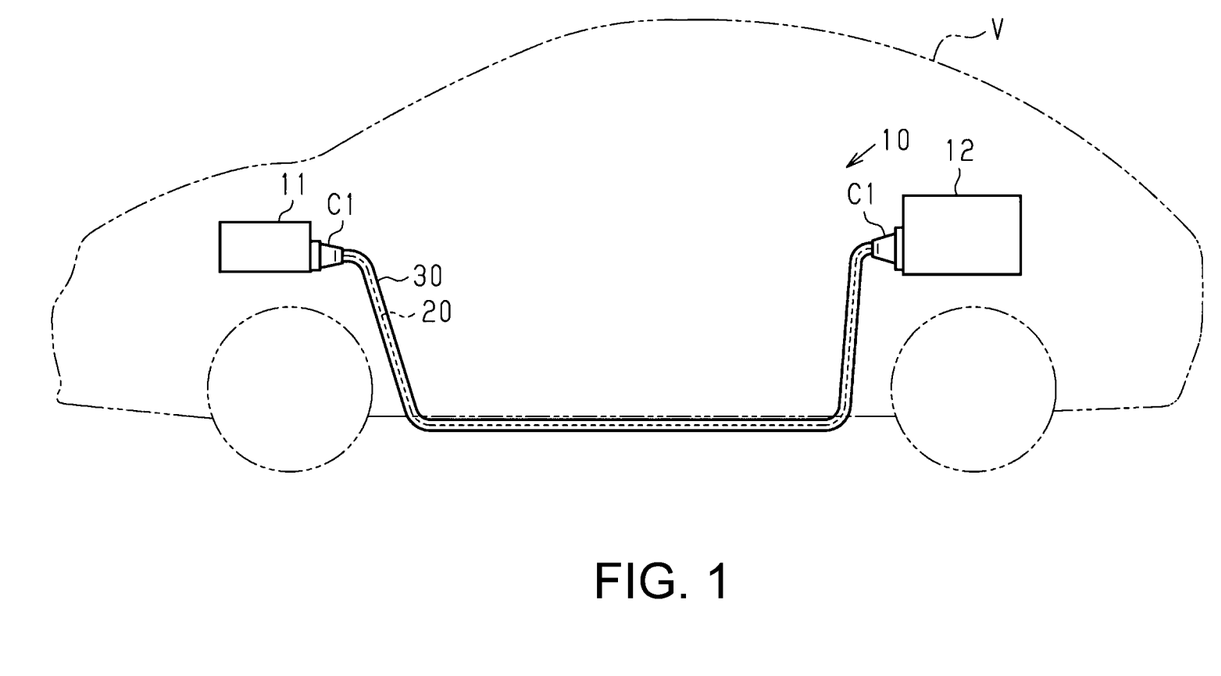
FIG. 1 is a schematic configuration diagram showing a wire harness according to an embodiment.

A wire harness 10 shown in FIG. 1 electrically connects two or three or more electrical devices (devices) to each other. The wire harness 10 connects, for example, an inverter 11 that is provided in a front portion of a vehicle such as a hybrid vehicle or an electric vehicle, and a high-voltage battery 12 that is provided rearward of the inverter 11 in the vehicle, to each other. The wire harness 10 is routed so as to pass under the floor or the like of the vehicle, for example. For example, the wire harness 10 is routed such that an intermediate portion in the lengthwise direction thereof passes through a space outside the cabin such as a space under the floor of the vehicle. The inverter 11 is connected to a motor (not shown) for driving wheels, which serves as a power source for vehicle travel. The inverter 11 generates AC power from DC power of the high-voltage battery 12, and supplies the AC power to the motor. The high-voltage battery 12 is a battery that can supply a voltage of several hundred volts, for example.

The wire harness 10 includes one or a plurality of (two in this example) electrical wires 20, a pair of connectors C1 that are respectively attached to the two ends of the electrical wires 20, and an exterior member 30 that collectively encloses the plurality of electrical wires 30.

One end portion of each electrical wire 20 is connected to the inverter 11 via a connector C1, and the other end portion of each electrical wire 20 is connected to the high-voltage battery 12 via the connector C1. Each electrical wire 20 is formed so as to have an elongated shape extending in the front-rear direction of the vehicle, for example. Each electrical wire 20 is formed so as to be able to be bent into a two-dimensional or three-dimensional shape corresponding to the routing path of the wire harness 10, for example. Each electrical wire 20 is a high-voltage electrical wire that can handle a high-voltage large current, for example. Each electrical wire 20 may be a non-shielded electrical wire that does not have an electromagnetic shielding structure, or a shielded electrical cable that has an electromagnetic shielding structure, for example.

Figure 2:
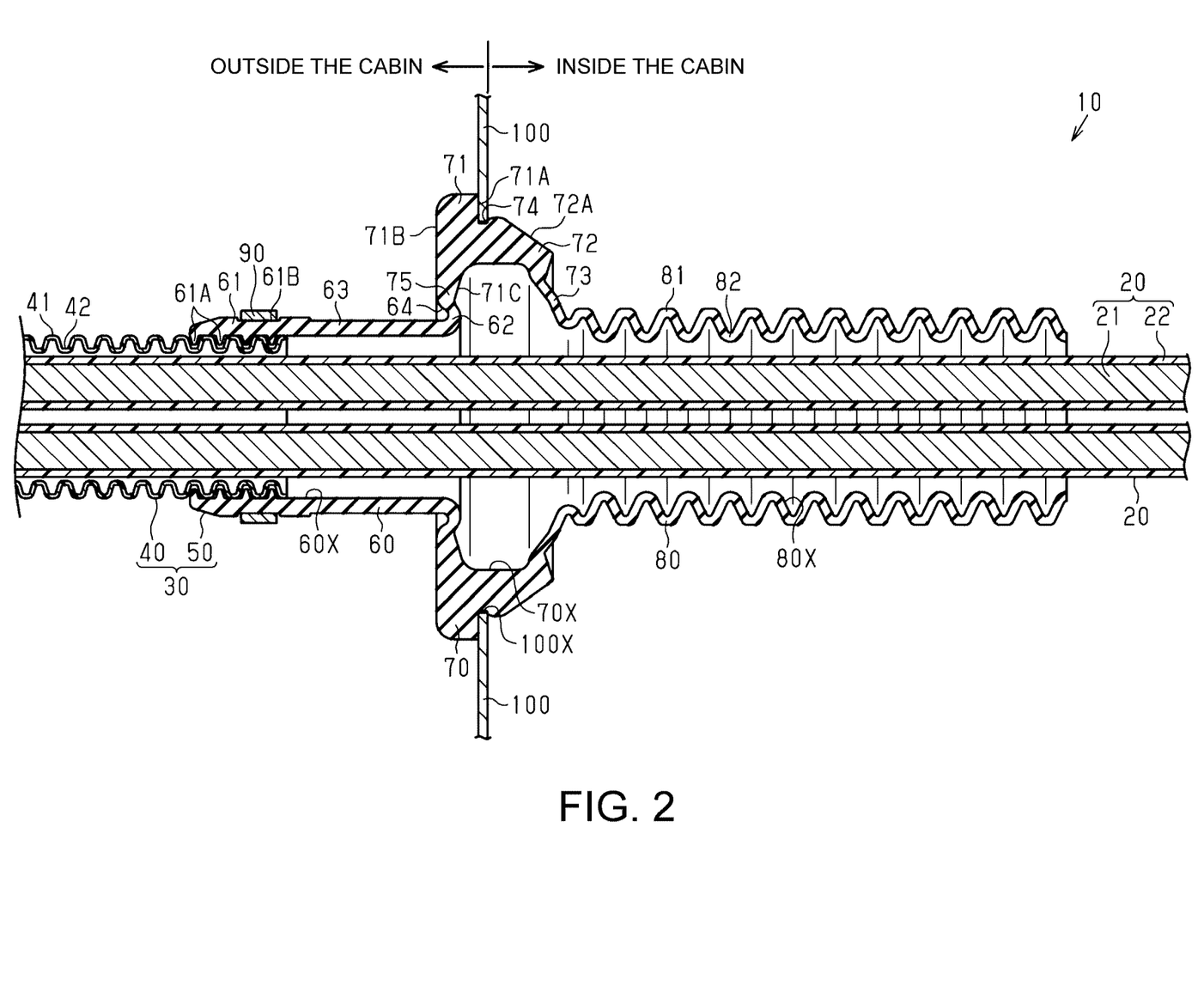
FIG. 2 is a schematic cross-sectional view showing a grommet according to an embodiment.

As shown in FIG. 2, each electrical wire 20 is a coated electrical wire that includes a core wire 21 that is formed of a conductor, and an insulation coating 22 that coats the outer circumferential surface of the core wire 21. For example, a stranded wire formed by twisting a plurality of metal strands, a columnar conductor (a single core wire, a bus bar, or the like) that is formed of a single columnar metal rod with a solid core structure, a tubular conductor (a pipe conductor) with a hollow core structure, or the like may be used as the core wire 21. Also, any combination of a stranded wire, a columnar conductor, and a tubular conductor may be used as the core wire 21. The core wire 21 may be made of a metal material such as a copper-containing material or an aluminum-containing material, for example. The core wire 21 is formed through extrusion molding, for example.

The shape of a cross-section of the core wire 21 taken along a plane orthogonal to the lengthwise direction of the core wire 21 (i.e. the shape of a transverse section) may be any shape. The shape of a transverse section of the core wire 21 is, for example, a circular shape, a semi-circular shape, a polygonal shape, a square shape, or a flat shape.

The insulation coating 22 coats the entire outer circumferential surface of the core wire 21 in an intimate contact state, for example. The insulation coating 22 is made of an insulating material such as a synthetic resin, for example. The insulation coating 22 can be formed by subjecting the core wire 21 to extrusion molding (extrusion coating), for example.

The exterior member 30 shown in FIG. 1 has an elongated tubular shape overall. A plurality of electrical wires 20 are passed through the internal space of the exterior member 30. The exterior member 30 is formed so as to enclose the entire outer circumferential surfaces of the plurality of electrical wires 20, for example. The exterior member 30 protects the electrical wires 20 from flying objects or water drops, for example. A pipe that is made of a metal or a resin, a protector that is made of a resin, a corrugated tube that is made of a resin or the like and has flexibility, a waterproof cover that is made of rubber, or a combination thereof may be used as the exterior member 30, for example. The metal pipe may be made of a metal material such as a copper-containing material or an aluminum-containing material, for example. The resin protector and the resin corrugated tube may be made of an electrically conductive resin material or an electrically non-conductive resin material, for example. The resin material may be a synthetic resin such as polyolefin, polyamide, polyester, or an ABS resin, for example.

As shown in FIG. 2, the exterior member 30 includes a corrugated tube 40 and a grommet 50.

The corrugated tube 40 has a tubular shape that collectively encloses the outer circumferential surfaces of the plurality of electrical wires 20, for example. The corrugated tube 40 has a bellows structure in which ring-shaped protrusions 41 and ring-shaped recesses 42 are continuously provided one after the other in the lengthwise direction of the corrugated tube 40. The corrugated tube 40 is more flexible than the core wires 21. The corrugated tube 40 according to the present embodiment is formed so as to have a cylindrical shape. The corrugated tube 40 according to the present embodiment is made of an electrically non-conductive resin material. The resin material may be a synthetic resin such as polyolefin, polyamide, polyester, or an ABS resin, for example.

The grommet 50 has a tubular shape that collectively encloses the outer circumferential surfaces of the plurality of electrical wires 20, for example. The grommet 50 is attached to a through hole 100X that is formed in the panel 100 of the vehicle body, for example. Here, the panel 100 is located between a waterproof area (e.g. a space outside the cabin) that needs to be protected from water, and a non-waterproof area (e.g. a space inside the cabin) that does not need to be protected from water, for example. That is to say, the panel 100 is provided so as to separate the space outside the cabin, which is a waterproof area and the space inside the cabin, which is a non-waterproof area, from each other. The through hole 100X is formed so as to penetrate through the panel 100 in the thickness direction thereof, so that a plurality of electrical wires 20 can be passed through the through hole 100X.

The grommet 50 may be made of an elastic material with a relatively high degree of hardness, for example. For example, a rubber such as EPDM (ethylene propylene diene rubber) or an elastomer can be used as the elastic material. The grommet 50 has the function of blocking water at the through hole 100X such that water does not enter the space inside the cabin, which is a non-waterproof area, from the space outside the cabin, which is a waterproof area, and the function of fixing the plurality of electrical wires 20 at the through hole 100X.

Figure 3:
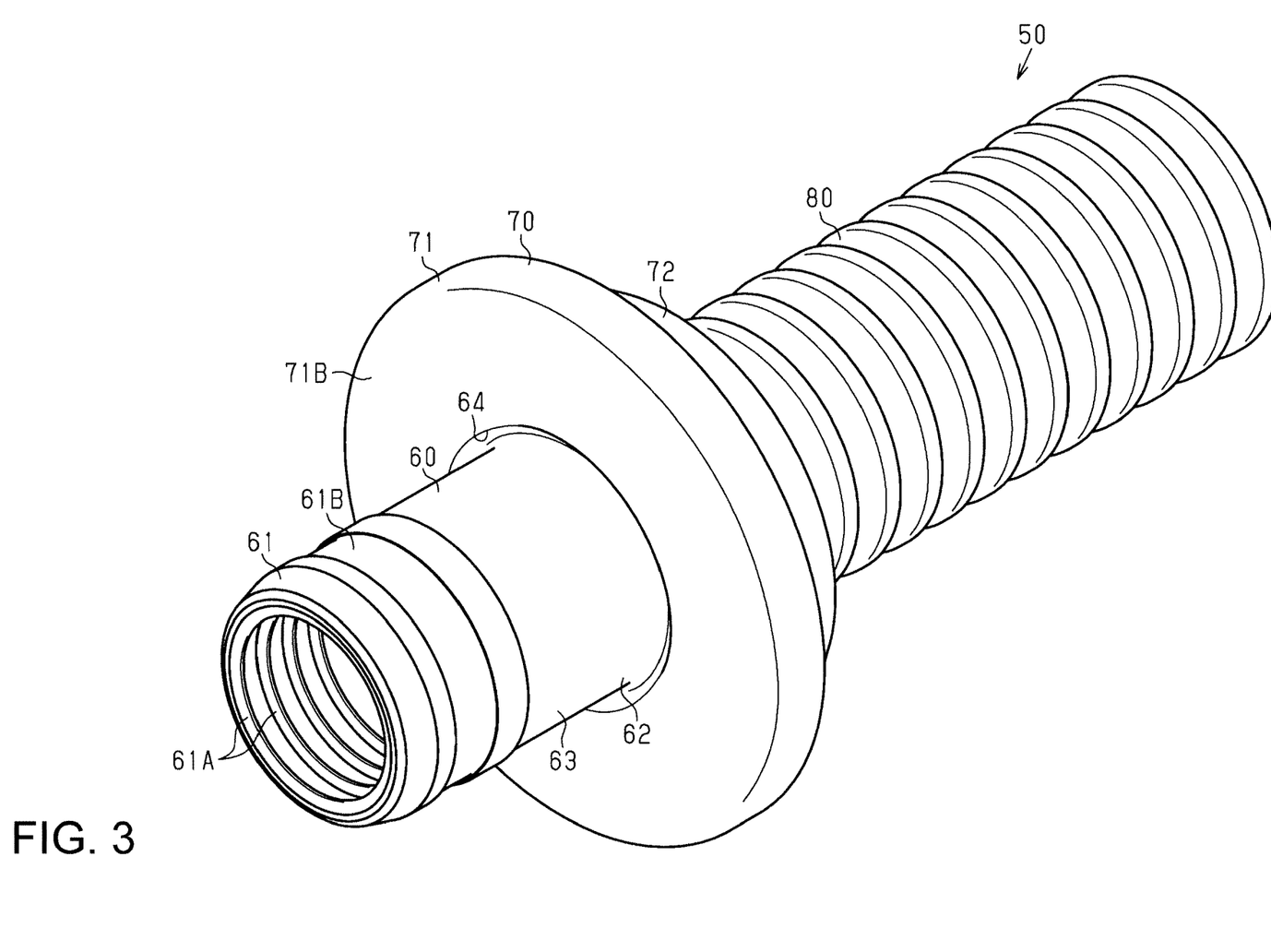
FIG. 3 is a schematic perspective view showing a grommet according to an embodiment.

As shown in FIG. 3, the grommet 50 according to the present embodiment is formed so as to have a cylindrical shape overall. The grommet 50 includes, for example, a tube portion 60 (tube), a flange portion 70 (flange) that is coupled to an end portion (end) of the tube portion 60, and a tube portion 80 that is coupled to an end portion of the flange portion 70 opposite to the end portion that is coupled to the tube portion 60. The flange portion 70 is formed so as to bulge further outward in a radial direction than the outer circumferential surfaces of the other portions, namely the tube portions 60 and 80. For example, the flange portion 70 is formed so as to protrude further outward in a radial direction than the tube portions 60 and 80 from the entire circumferences of the tube portions 60 and 80. That is to say, the outer diameter of the flange portion 70 is greater than the outer diameters of the tube portions 60 and 80. The grommet 50 is, for example, a single part in which the tube portion 60, the flange portion 70, and the tube portion 80 are continuously formed so as to be integrated into one piece.

As shown in FIG. 2, in a state where the grommet 50 is attached to the through hole 100X of the panel 100, the flange portion 70 is fitted into the through hole 100X, the tube portion 60 is located outside the cabin, and the tube portion 80 is located in the cabin. An end portion of the grommet 50 (the tube portion 60) is fitted to an end portion of the corrugated tube 40. For example, an end portion of the tube portion 60 is fitted onto the outer surface of an end portion of the corrugated tube 40. In a state where an end portion of the tube portion 60 is fitted to an end portion of the corrugated tube 40, the internal space of the grommet 50 and the internal space of the corrugated tube 40 are in communication with each other, which forms a passage through which a plurality of electrical wires 20 can be passed. The internal space of the grommet 50 is constituted by an internal space 60X of the tube portion 60, an internal space 70X of the flange portion 70, and an internal space 80X of the tube portion 80, which are in communication with each other.

The flange portion 70 is configured such that, in a state where the grommet 50 is attached to the through hole 100X, the flange portion 70 elastically abuts against the panel 100 in intimate contact therewith. The flange portion 70 has a ring-like plate shape that matches the through hole 100X overall, for example. The size of the flange portion 70 in a radial direction thereof (i.e. thickness) is greater than the thickness of each of the tube portions 60 and 80, for example.

The flange portion 70 includes an outer flange 71 that is coupled to the tube portion 60 and an inner flange 72 that is coupled to the tube portion 80. In a state where the grommet 50 is attached to the through hole 100X, the outer flange 71 is located outside the cabin, and the inner flange 72 is located inside the cabin.

The outer flange 71 has a greater outer diameter than the inner flange 72, for example. The outer flange 71 has a greater thickness than the inner flange 72, for example.

The inner flange 72 has a slightly greater size in the axial direction (lengthwise direction) of the grommet 50 than the outer flange 71, for example. An inclined surface 72A is formed on the outer circumferential surface of the inner flange 72, which is inclined such that the outer diameter of the inner flange 72 decreases in the direction from the outer flange 71 to the tube portion 80. Due to the inclined surface 72A, the flange portion 70 can easily be fitted into the through hole 100X. The inner flange 72 includes an end portion 73 that is coupled to the tube portion 80. The end portion 73 of the inner flange 72 has a smaller thickness than other portions of the inner flange 72, for example. The end portion 73 is formed so as to be inclined such that the outer diameter and inner diameter thereof decrease in the direction from the outer flange 71 to the tube portion 80, for example.

A groove portion 74 that constitutes a peripheral edge portion of the through hole 100X and into which the panel 100 is fitted is provided between the outer flange 71 and the inner flange 72. In a state where the panel 100 is fitted into the groove portion 74, the outer flange 71 is in intimate contact with the surface of the panel 100 that faces the space outside the cabin, and the inner flange 72 is in intimate contact with the surface of the panel 100 that faces the space inside the cabin. Thus, the panel 100 is elastically held between the outer flange 71 and the inner flange 72. Therefore, if the panel 100 is fitted into the groove portion 74, the grommet 50 is restricted from moving in the axial direction thereof.

The outer flange 71 has an attachment surface 71A that comes into intimate contact with the surface that faces the space outside the cabin, of the panel 100, and an outer surface 71B that is on the opposite side of the attachment surface 71A. The outer surface 71B is a surface that faces toward the tube portion 60. The outer surface 71B is formed so as to extend in a radial direction of the grommet 50, for example. The outer surface 71B according to the present embodiment is formed such that, in a state where the grommet 50 is attached to the through hole 100X, the outer surface 71B extends in parallel with the surface that faces the space outside the cabin, of the panel 100. Also, the outer flange 71 includes an inner end portion 75 (inner end) that is coupled to an end portion of the tube portion 60. The inner end portion 75 is an end portion that is provided in an inner area of the outer flange 71 in a radial direction. The inner end portion 75 has the outer surface 71B and an inner circumferential surface 71C that is on the opposite side of the outer surface 71B and faces toward the internal space 70X of the flange portion 70.

Figure 4:
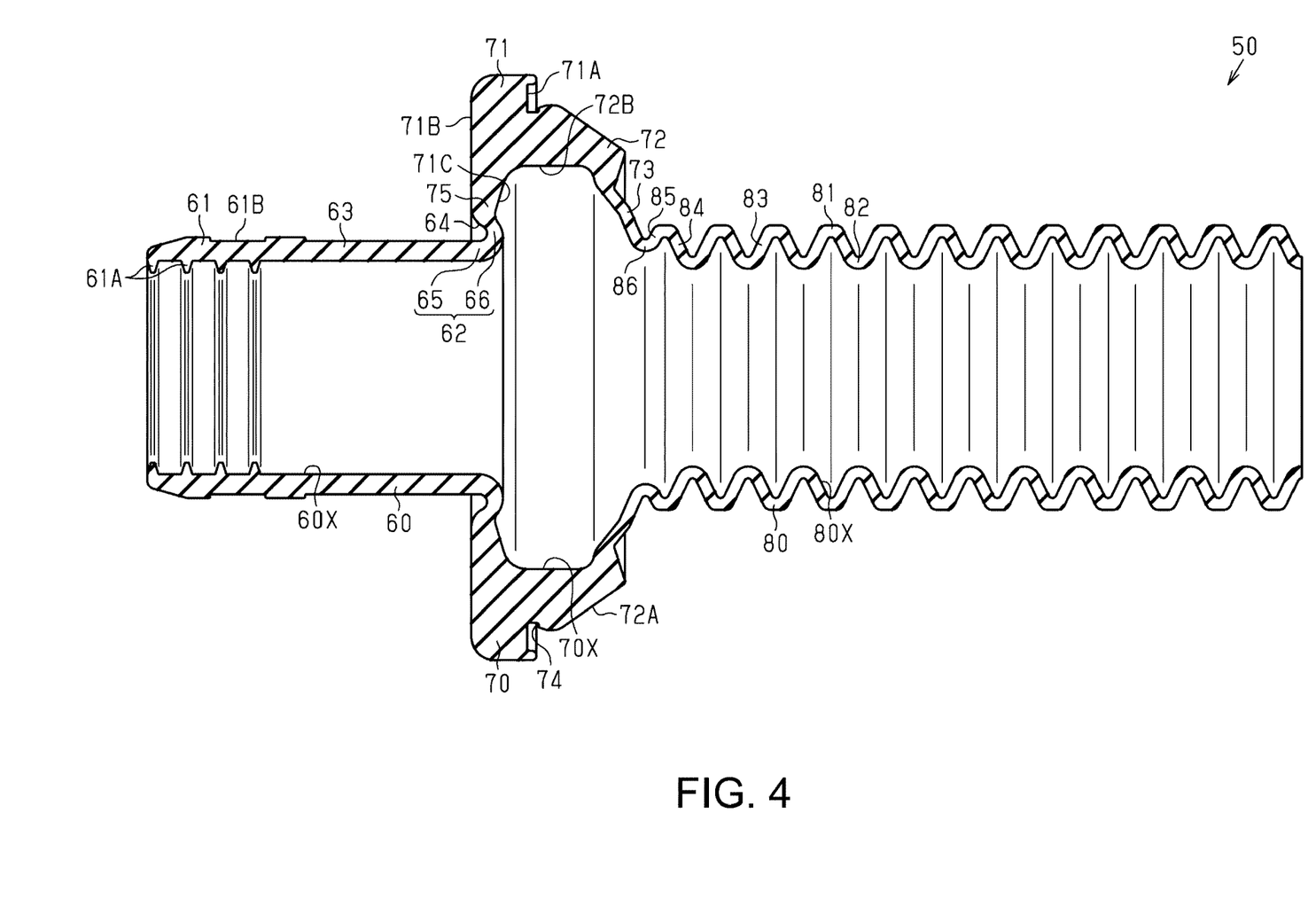
FIG. 4 is a schematic cross-sectional view showing a grommet according to an embodiment.

As shown in FIG. 4, the flange portion 70 has a greater inner diameter than the tube portion 60 and the tube portion 80. That is to say, the aperture diameter of the internal space 70X of the flange portion 70 is greater than the aperture diameter of the internal space 60X of the tube portion 60 and the aperture diameter of the internal space 80X of the tube portion 80. The internal space 70X is defined by the inner circumferential surface 71C of the outer flange 71 and an inner circumferential surface 72B of the inner flange 72. The inner circumferential surface 71C of the outer flange 71 is formed so as to be inclined such that the aperture diameter of the internal space 70X increases in the direction from the tube portion 60 to the inner flange 72, for example. The inner circumferential surface 72B of the inner flange 72 includes, for example, a portion that is formed so as to extend in parallel with the axial direction of the grommet 50, and a portion that is inclined such that the aperture diameter of the internal space 70X decreases in the direction toward the tube portion 80.

Note that "parallel", "orthogonal", and "horizontal" in the present description are not necessarily strictly parallel, orthogonal, or horizontal, and may be substantially parallel, orthogonal, and horizontal within the range in which the effects of the present embodiment can be achieved. Also, in the present description, surfaces that respectively face toward the internal spaces 60X, 70X, and 80X, of components of the grommet 50, are referred to as "inner circumferential surfaces", and surfaces that are respectively on the opposite side of the inner circumferential surfaces, of components of the grommet 50, are referred to as "outer circumferential surfaces".

The tube portion 60 is formed coaxially with the flange portion 70, for example. The internal space 60X of the tube portion 60 has a smaller aperture diameter than the internal space 70X of the flange portion 70, for example. The internal space 60X of the tube portion 60 is formed so as to have an approximately constant aperture diameter along the entire length of the tube portion 60 in the axial direction thereof, for example. That is to say, the tube portion 60 is formed so as to have an approximately constant inner diameter along the entire length of the tube portion 60 in the axial direction thereof.

As shown in FIG. 2, the tube portion 60 includes a connection portion 61 that is connected to an end portion of the corrugated tube 40, an end portion 62 (one end portion) that is coupled to the inner end portion 75 of the outer flange 71, and an intermediate portion 63 that is provided between the connection portion 61 and the end portion 62.

The connection portion 61 is formed so as to have a tubular shape with a size that allows the connection portion 61 to be fitted onto the outer circumferential surface of the corrugated tube 40. The connection portion 61 according to the present embodiment is formed so as to have a cylindrical shape. The inner circumferential surface of the connection portion 61 is provided with one or a plurality of (four in this example) lips 61A that lock to the corrugated tube 40, for example. The lips 61A are formed continuously along the entire circumference of the inner circumferential surface of the connection portion 61 so as to have a closed ring shape, for example. The lips 61A according to the present embodiment are formed so as to enter the ring-shaped recesses 42 of the corrugated tube 40 when the connection portion 61 is fitted onto the outer circumferential surface of the corrugated tube 40.

The outer circumferential surface of the connection portion 61 is provided with a fixing portion 61B that is formed so as to have a groove shape. The fixing portion 61B is formed continuously along the entire circumference of the outer circumferential surface of the connection portion 61, for example. The fixing portion 61B is provided with a fixing member 90. For example, a cable tie, a swaging ring, or the like that is made of resin or metal may be used as the fixing member 90, for example. The connection portion 61 is fixed to the corrugated tube 40 with the fixing member 90 being fastened to the outer circumferential surface of the connection portion 61. Specifically, the connection portion 61 is fastened with the fixing member 90 from the outer circumferential surface side so that the connection portion 61 comes into intimate contact with the corrugated tube 40 in a liquid-tight state. With this configuration, it is possible to prevent water from entering the grommet 50 from the gap between the connection portion 61 (the tube portion 60) and the corrugated tube 40.

The intermediate portion 63 of the tube portion 60 is formed so as to have a tubular shape with a size that allows a plurality of electrical wires 20 to pass therethrough. The intermediate portion 63 according to the present embodiment is formed so as to have a cylindrical shape in which both the outer circumferential surface and the inner circumferential surface are substantially even. The inner circumferential surface of the intermediate portion 63 according to the present embodiment is formed so as to extend in parallel with the axial direction of the grommet 50, together with the inner circumferential surface of the connection portion 61.

The end portion 62 of the tube portion 60 is coupled to, and is integrated with, the inner end portion 75 of the outer flange 71. A connection portion between the end portion 62 of the tube portion 60 and the inner end portion 75 of the outer flange 71 is provided with a recessed portion 64 (recess) that is recessed in the direction from the outer surface 71B of the outer flange 71 to the inner circumferential surface 71C of the outer flange 71. With this configuration, the end portion 62 of the tube portion 60 is formed so as to protrude toward the inner circumferential surface 71C side of the outer flange 71, relative to the outer surface 71B of the outer flange 71.

Figure 5:
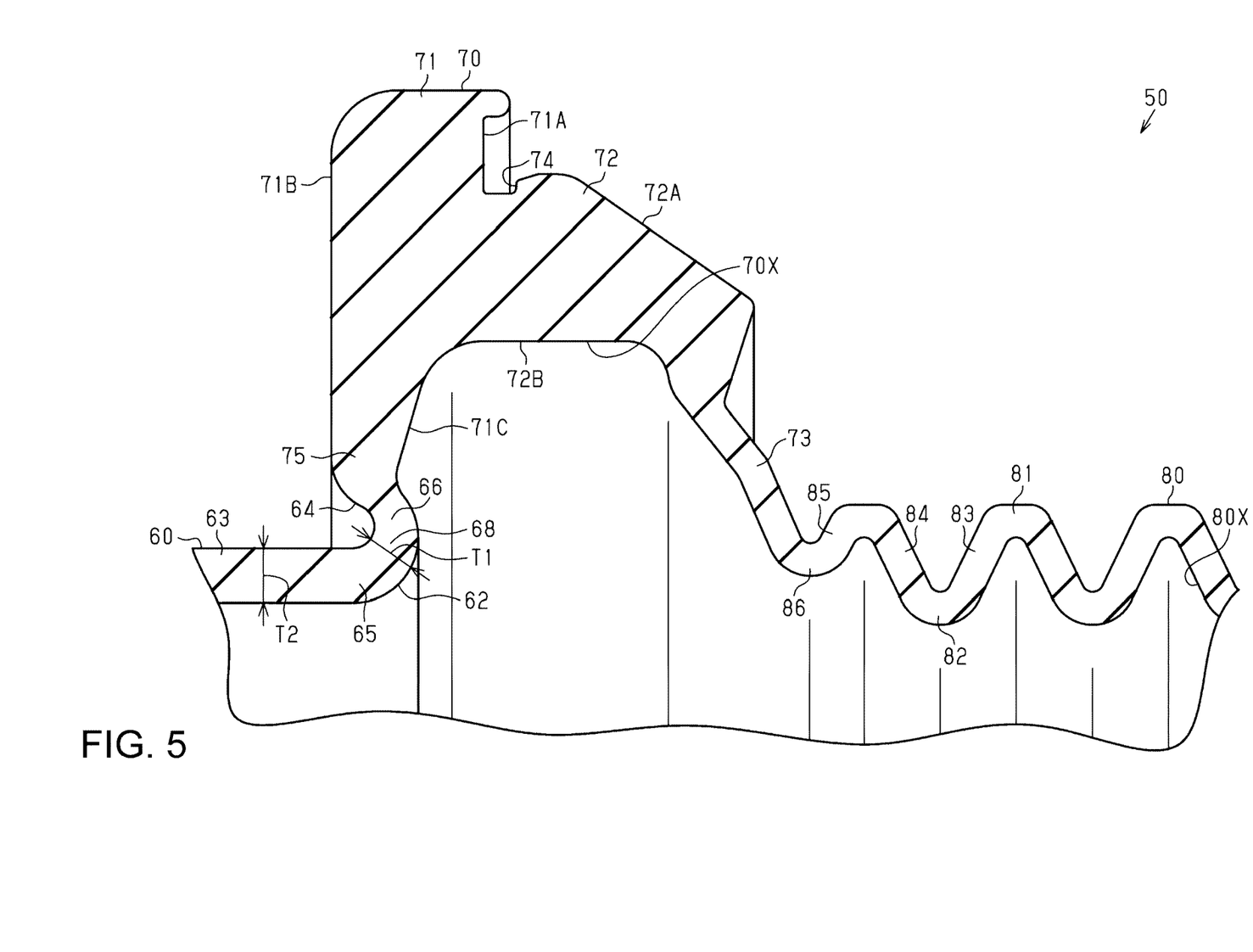
FIG. 5 is an enlarged cross-sectional view showing a grommet according to an embodiment.

As shown in FIG. 5, the end portion 62 of the tube portion 60 according to the present embodiment includes a protruding portion 65 (protrusion) that protrudes toward the inner circumferential surface 71C side relative to the outer surface 71B of the outer flange 71, and a bent portion 66 (bend) that is bent from the leading end (the protruding end) of the protruding portion 65 toward the inner end portion 75 of the outer flange 71. At the end portion 62, a space is formed between the outer circumferential surface of the protruding portion 65 and the outer circumferential surface of the bent portion 66, and this space constitutes the recessed portion 64. Due to the recessed portion 64 being formed, a bending fulcrum 68 of the tube portion 60 can be set at a position that is distanced from the outer surface 71B of the inner end portion 75 of the outer flange 71 toward the inner circumferential surface 71C.

The protruding portion 65 is formed so as to extend in parallel with the axial direction of the grommet 50, for example. The inner circumferential surface of the protruding portion 65 according to the present embodiment is formed so as to extend in parallel with the axial direction of the grommet 50, together with the inner circumferential surface of the intermediate portion 63.

The bent portion 66 is formed so as to extend in a direction that intersects the protruding direction of the protruding portion 65 (the axial direction of the grommet 50 in this example). The bent portion 66 is formed so as to extend from the leading end of the protruding portion 65 and so as to be folded back outward in the radial direction and toward the intermediate portion 63, for example. The bent portion 66 is bent so as to be curved in a cross-sectional view, for example. The bent portion 66 has a cross section of a quarter-circular arc shape, a semi-circular arc shape, or a U-shape, for example. The bent portion 66 according to the present embodiment has a cross section of a quarter-circular arc shape. In other words, according to the present embodiment, the cross section of the protruding portion 65 and the bent portion 66 (i.e. the end portion 62) has a quarter-circular shape overall, and the cross section of the recessed portion 64 has a quarter-circular shape.

The bent portion 66 is formed such that the inner circumferential surface thereof protrudes further toward the internal space 70X of the flange portion 70 (toward the inner flange 72) relative to the inner circumferential surface 71C of a portion that is located at the innermost position of the inner end portion 75 of the outer flange 71 in a radial direction, for example. That is to say, the inner circumferential surface of the bent portion 66 is formed so as to enter the internal space 70X of the flange portion 70.

A thickness T1 of the bent portion 66 (i.e. the size of the bent portion 66 in a radial direction thereof) is smaller than a thickness T2 of the intermediate portion 63, for example. The thickness T1 of the bent portion 66 is smaller than the thickness of the protruding portion 65, for example.

As shown in FIG. 2, the tube portion 80 is formed so as to have a tubular shape with a size that allows a plurality of electrical wires 20 to pass therethrough. The tube portion 80 according to the present embodiment is formed so as to have a cylindrical shape. The tube portion 80 is formed coaxially with the tube portion 60 and the flange portion 70, for example. The inner diameter of the tube portion 80 is smaller than the inner diameter of the flange portion 70, for example. The inner diameter of the tube portion 80 is substantially the same as the inner diameter of the tube portion 60.

An end portion of the tube portion 80 is connected to the end portion 73 of the inner flange 72. The tube portion 80 has a bellows structure in which ring-shaped protrusions 81 and ring-shaped recesses 82 are continuously provided one after the other in the lengthwise direction of the tube portion 80. Due to the bellows structure, the tube portion 80 is more flexible than the tube portion 60 and the flange portion 70. Therefore, the tube portion 80 can easily be bent according to the shape of the electrical wires 20 routed in the cabin.

As shown in FIGS. 4 and 5, the ring-shaped protrusions 81 and the ring-shaped recesses 82 are each formed so as to have a wave-shaped cross section in which V-shaped portions continue in the axial direction of the grommet 50. Top portions of the ring-shaped protrusions 81 and bottom portions of the ring-shaped recesses 82 are connected by inclined portions 83 and 84. The inclined portions 83 and 84 are formed so as to extend in a direction that intersect both the axial direction and the radial direction of the grommet 50. Each inclined portion 83 that extends from a bottom portion of a ring-shaped recess 82 to a top portion of a ring-shaped protrusion 81 is inclined such that the inner diameter of the tube portion 80 increases in a direction toward the top portion of the ring-shaped protrusion 81. Each inclined portion 84 that extends from a top portion of a ring-shaped protrusion 81 to a bottom portion of a ring-shaped recess 82 is inclined such that the inner diameter of the tube portion 80 decreases in a direction toward the bottom portion of the ring-shaped recess 82.

The tube portion 80 includes an inclined portion 85 that connects the end portion 73 of the inner flange 72 and a top portion of a ring-shaped protrusion 81. The inclined portion 85 is formed so as to extend in a direction that intersects the direction in which the end portion 73 extends, for example. The inclined portion 85 extends in parallel with the inclined portions 83, for example. The inclined portion 85 is formed so as to be shorter than the inclined portions 83, for example. For example, the length of the inclined portion 85 is set to be approximately ½ to ¼ of the length of the inclined portions 83. A connection portion 86 between the inclined portion 85 and the end portion 73 of the inner flange 72 is located outward of the bottom portion of a ring-shaped recess 82 in a radial direction. That is to say, a step that extends in the radial direction is formed between the connection portion 86 and the bottom portion of the ring-shaped recess 82. For example, when the internal space 80X of the tube portion 80 is seen in a direction from the internal space 60X of the tube portion 60, the inclined portion 84 that is closest to the inclined portion 85 is exposed from behind the connection portion 86 located between the end portion 73 of the inner flange 72 and the inclined portion 85. With this configuration, when electrical wires 20 are to be inserted into the grommet 50 from the tube portion 60 side, the connection portion 86 and the inclined portion 84 that is exposed from behind the connection portion 86 are enabled to function as guide portions that guide the electrical wires 20 to the internal space 80X of the tube portion 80.

As shown in FIG. 2, the curvature radius of the top portion of each ring-shaped protrusion 81 is smaller than the curvature radius of the top portion of each ring-shaped protrusion 41 of the corrugated tube 40, for example. The curvature radius of the bottom portion of each ring-shaped recess 82 is smaller than the curvature radius of the bottom portion of each ring-shaped recess 42 of the corrugated tube 40, for example. The curvature radius of the top portion of each ring-shaped protrusion 81 may be set to approximately 1 mm to 2 mm, for example. The curvature radius of the bottom portion of each ring-shaped recess 82 may be set to approximately 0.5 mm to 1 mm, for example. In this way, by setting the curvature radius of the top portion of each ring-shaped protrusion 81 and the curvature radius of the bottom portion of each ring-shaped recess 82 to be small, it is possible to increase the distance between the top portion of the ring-shaped protrusion 81 and the bottom portion of the ring-shaped recess 82. Thus, it is possible to increase a deformable area of the tube portion 80, and improve the flexibility of the tube portion 80.

The plurality of electrical wires 20 are formed so as to extend from the space outside the cabin, which is a waterproof area, to the space inside the cabin, which is a non-waterproof area, through the internal space of the grommet 50, for example. The plurality of electrical wires 20 are led out from the end portion opposite to the end portion connected to the flange portion 70, of the tube portion 80, for example. The electrical wires 20 lead out from the tube portion 80 are fixed to the tube portion 80 using a piece of tape (not shown) wound around the outer circumferential surface of the tube portion 80 and the outer circumferential surface of the electrical wires 20.

Figure 6:
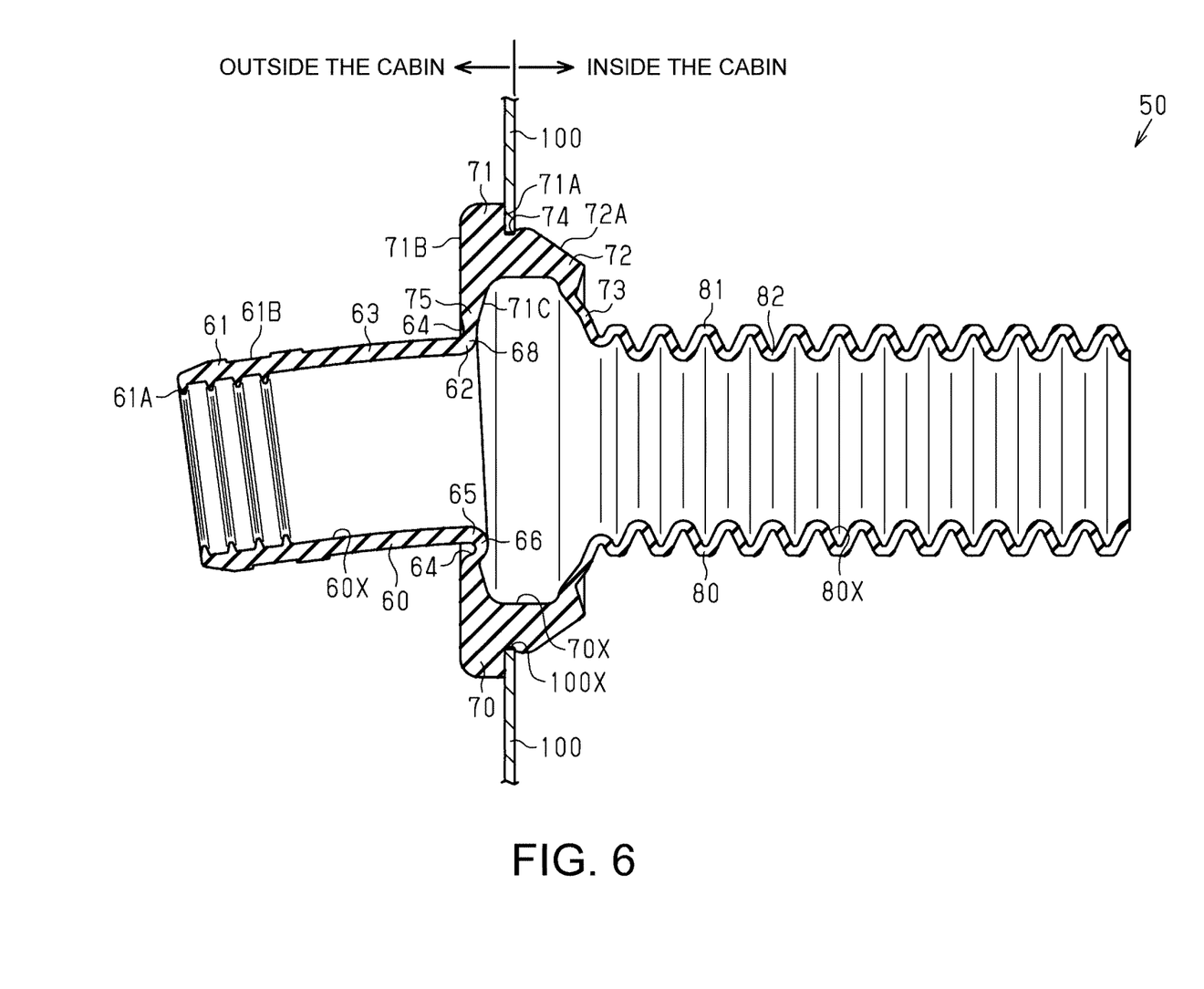
FIG. 6 is a schematic cross-sectional view showing a grommet according to an embodiment.

The following describes operations of the present embodiment with reference to FIG. 6.

In the grommet 50, a connection portion between the end portion 62 of the tube portion 60 and the inner end portion 75 of the outer flange 71 is provided with the recessed portion 64 that is recessed in the direction from the outer surface 71B of the outer flange 71 to the inner circumferential surface 71C of the outer flange 71. With this configuration, the end portion 62 of the tube portion 60 is formed so as to protrude toward the inner circumferential surface 71C side of the outer flange 71, relative to the outer surface 71B of the outer flange 71. With this configuration, the bending fulcrum 68 of the tube portion 60 is distanced from the outer surface 71B of the inner end portion 75 of the outer flange 71 toward the inner circumferential surface 71C of the outer flange 71. Therefore, as shown in FIG. 6, when the tube portion 60 is bent in a given direction (downward in the figure, in this example), the pulling force applied in the bending direction is less likely to affect the outer flange 71 than that in the conventional grommet 200 (see FIG. 10). At this time, at the end portion 62 of the tube portion 60, the protruding portion 65 and the bent portion 66 that are located opposite to the bending direction in the circumferential direction (i.e. located on the upper side in the figure) deform according to the bending of the tube portion 60. Specifically, the protruding portion 65 and the bent portion 66 deform such that the recessed portion 64 becomes smaller. Due to the protruding portion 65 and the bent portion 66 deforming, the pulling force applied in the bending direction is less likely to affect the outer flange 71. As a result, even if the tube portion 60 is bent in a given direction, the outer flange 71 can be prevented from deforming according to the bending, and the outer flange 71 can be prevented from moving away from the panel 100. With this configuration, it is possible to effectively prevent a gap from being formed between the attachment surface 71A of the outer flange 71 and the panel 100.

The following describes operative effects of the present embodiment.

(1) A connection part (connection) between the end portion 62 of the tube portion 60 and the inner end portion 75 of the outer flange 71 is provided with the recessed portion 64 that is recessed in the direction toward the inner circumferential surface 71C side of the outer flange 71, relative to the outer surface 71B of the outer flange 71. With this configuration, even if the tube portion 60 is bent in a given direction, it is possible to prevent a gap from being formed between the attachment surface 71A of the outer flange 71 and the panel 100. With this configuration, it is possible to desirably prevent water from entering from a gap between the attachment surface 71A of the outer flange 71 and the panel 100. Therefore, it is possible to prevent the waterproof properties of the grommet 50 from degrading.

(2) The end portion 62 of the tube portion 60 is constituted by the protruding portion 65 that protrudes toward the inner circumferential surface 71C side, relative to the outer surface 71B of the outer flange 71, and the bent portion 66 that is bent from the leading end of the protruding portion 65 toward the inner end portion 75 of the outer flange 71. With this configuration, the bent portion 66 functions as the bending fulcrum 68 of the tube portion 60, and the bending fulcrum 68 is located at a position that is distanced from the outer surface 71B of the inner end portion 75 of the outer flange 71 toward the inner circumferential surface 71C of the outer flange 71. Therefore, even if the tube portion 60 is bent in a given direction, it is possible to prevent a gap from being formed between the attachment surface 71A of the outer flange 71 and the panel 100.

(3) The thickness of the bent portion 66 is smaller than the thickness of other portions of the tube portion 60. With this configuration, the thickness of the bent portion 66, which functions as the bending fulcrum 68 of the tube portion 60, is smaller than other portions. Therefore, it is possible to improve the flexibility of the tube portion 60.

(4) The inner circumferential surface of the bent portion 66 is formed so as to protrude further toward the internal space 70X of the flange portion 70 relative to the inner circumferential surface 71C of the inner end portion 75 of the outer flange 71. With this configuration, the length of the protruding portion 65 and the length of the bent portion 66 can be increased. In other words, the length of the portion that deforms according to the bending of the tube portion 60 can be increased. Therefore, it is possible to expand a bendable area of the tube portion 60, which can be bent without forming a gap between the attachment surface 71A of the outer flange 71 and the panel 100.

Also, even though the recessed portion 64 is formed, a certain thickness of the bent portion 66 can be secured. Thus, it is possible to improve the durability of the bent portion 66, and improve the reliability of the grommet 50.

(5) The recessed portion 64 is formed continuously along the entire circumference of the tube portion 60. With this configuration, even if the tube portion 60 is bent in any given circumferential direction, it is possible to prevent a gap from being formed between the attachment surface 71A of the outer flange 71 and the panel 100. Therefore, the bending direction of the tube portion 60 is not limited, and the flexibility of the bending direction of the tube portion 60 can be improved.

(6) The inclined portion 85 that connects the end portion 73 of the inner flange 72 and the top portion of a ring-shaped protrusion 81 is formed so as to be shorter than each inclined portion 83 that extends from the bottom portion of a ring-shaped recess 82 to the top portion of a ring-shaped protrusion 81. With this configuration, the connection portion 86 between the inclined portion 85 and the end portion 73 of the inner flange 72 is provided at a position that is outward of the bottom portions of the ring-shaped recesses 82 in a radial direction. With this configuration, when electrical wires 20 are to be inserted into the grommet 50 from the tube portion 60 side, the connection portion 86 and the inclined portion 84 that is exposed from behind the connection portion 86 are enabled to function as guide portions that guide the electrical wires 20 to the internal space 80X of the tube portion 80. Therefore, it is possible to improve workability when the electrical wires 20 are to be inserted into the grommet 50.

(7) The curvature radius of the top portion of each ring-shaped protrusion 81 of the tube portion 80 is smaller than the curvature radius of the top portion of each ring-shaped protrusion 41 of the corrugated tube 40. Also, the curvature radius of the bottom portion of each ring-shaped recess 82 of the tube portion 80 is smaller than the curvature radius of the bottom portion of each ring-shaped recess 42 of the corrugated tube 40. In this way, by setting the curvature radius of the top portion of each ring-shaped protrusion 81 and the curvature radius of the bottom portion of each ring-shaped recess 82 to be small, it is possible to increase the distance between the top portion of the ring-shaped protrusion 81 and the bottom portion of the ring-shaped recess 82. Thus, it is possible to increase a deformable area of the tube portion 80, and improve the flexibility of the tube portion 80.

Other Embodiments

The above-described embodiment may be modified in the following manner and carried out. The above-described embodiment and the following modifications may be combined with each other and carried out as long as technical inconsistencies do not arise.

Figure 7:
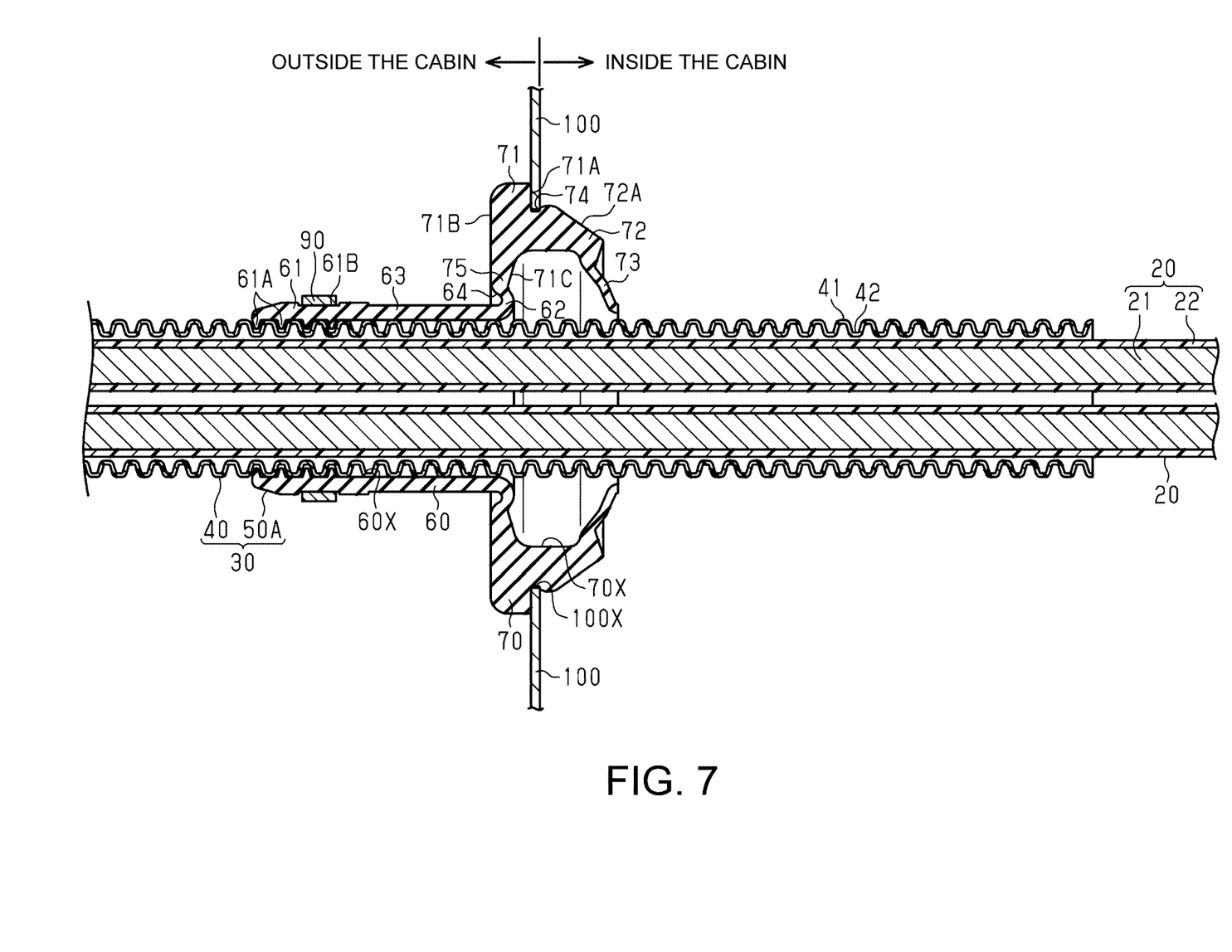
FIG. 7 is a schematic cross-sectional view showing a grommet according to a modified example.

As shown in FIG. 7 the corrugated tube 40 may be inserted into a grommet 50A. The corrugated tube 40 in this case is formed so as to extend from the space outside the cabin, which is a waterproof area, to the space inside the cabin, which is a non-waterproof area, via the internal space of the grommet 50A. The corrugated tube 40 is led out from both end portions of the grommet 50A. The tube portion 80 of the grommet 50 shown in FIG. 2 can be omitted from the grommet 50A in this case. The grommet 50A is fixed to the corrugated tube 40 with the fixing member 90, which is provided on the connection portion 61 of the tube portion 60, fastening the outer circumferential surface of the grommet 50A.

The plurality of electrical wires 20 in this case are inserted into the corrugated tube 40 that is inserted into the grommet 50A. The plurality of electrical wires 20 are led out from an end portion that is located in the cabin, of the corrugated tube 40, for example. The electrical wires 20 the corrugated tube 40 are fixed to the corrugated tube 40 with a piece of tape (not shown) wound around the outer circumferential surface of an end portion of the corrugated tube 40 and the outer circumferential surface of the electrical wires 20.

In the above-described embodiment, the length of the protruding portion 65 of the end portion 62 of the tube portion 60 is set to be constant along the entire circumference. The present disclosure is not limited to such a configuration, and the length of the protruding portion 65 may be set to be different at one or more portions in the circumferential direction.

Figure 8:
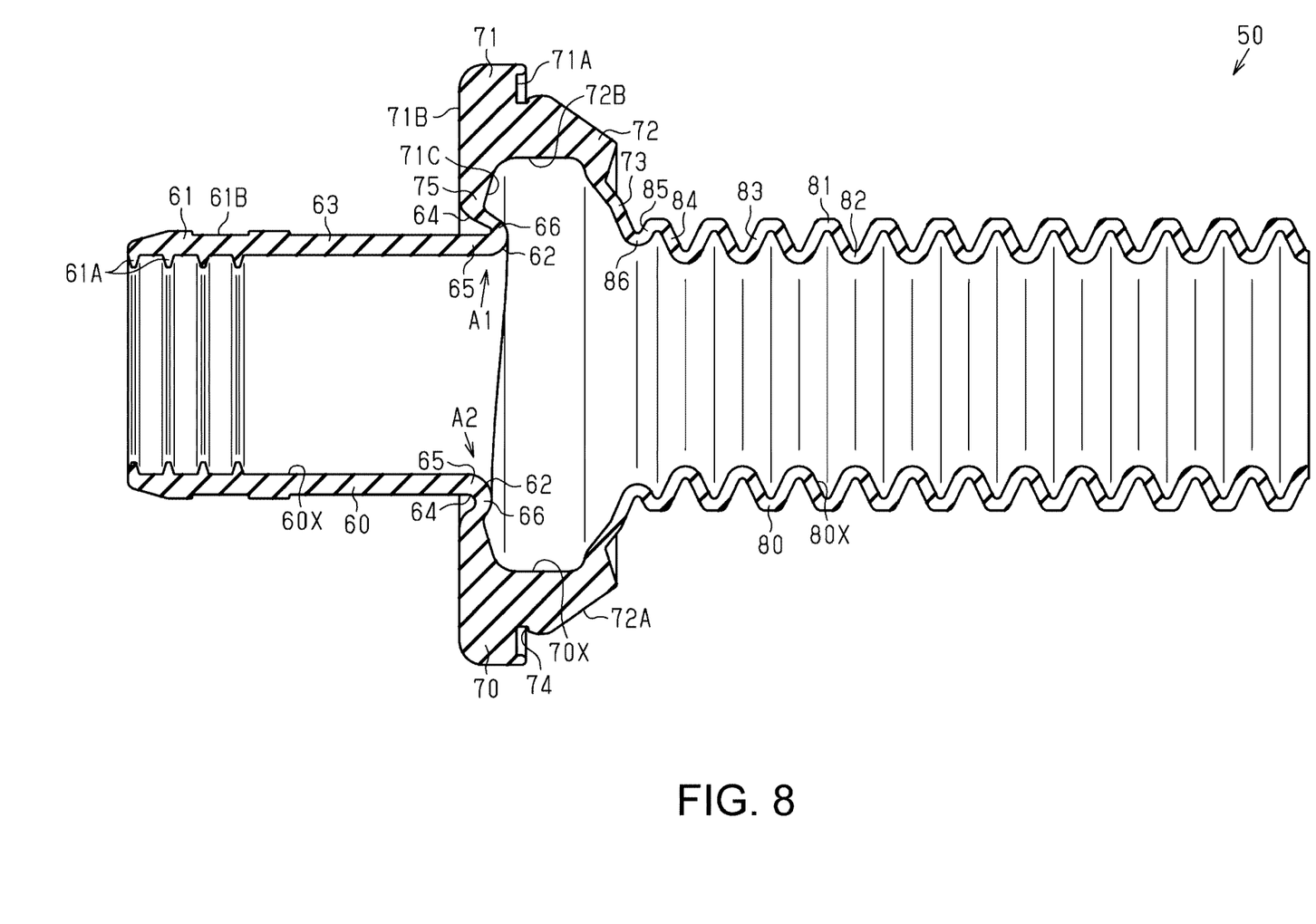
FIG. 8 is a schematic cross-sectional view showing a grommet according to a modified example.

For example, as shown in FIG. 8, the protruding portion 65 may be set to have different lengths at a first portion A1 (the upper portion in the figure) and a second portion A2 (the lower portion in the figure) that are located at different positions in the circumferential direction of the tube portion 60. In other words, the recessed portion 64 may have different depths at the first portion A1 and the second portion A2. In the example shown in FIG. 8, the length of the protruding portion 65 at the first portion A1 is greater than the length of the protruding portion 65 at the second portion A2. In this case, the tube portion 60 is bent in a direction that is displaced from the first portion A1 by approximately 180 degrees in the circumferential direction of the tube portion 60 (downward in the figure, in this example). With this configuration, the length of the protruding portion 65 can be increased at the first portion A1 that deforms according to the bending of the tube portion 60. Therefore, it is possible to expand a bendable area of the tube portion 60, which can be bent without forming a gap between the attachment surface 71A of the outer flange 71 and the panel 100.

Note that the first portion A1 and the second portion A2 may be areas that each expand in a predetermined range in the circumferential direction of the tube portion 60.

In the above-described embodiment, the recessed portion 64 is formed along the entire circumference of the tube portion 60. The present disclosure is not limited to this configuration, and the recessed portion 64 may be formed only on a portion of the tube portion 60 in the circumferential direction.

In the above-described embodiment, the end portion 62 of the tube portion 60 is formed such that the inner circumferential surface of the bent portion 66 protrudes further toward the internal space 70X of the flange portion 70 relative to the inner circumferential surface 71C of the inner end portion 75 of the outer flange 71, for example. The present disclosure is not limited to this configuration, and the inner circumferential surface of the bent portion 66 may be formed so as to be flush with the inner circumferential surface 71C of the inner end portion 75, for example.

In the above-described embodiment, the thickness of the bent portion 66 is smaller than the thickness of other portions of the tube portion 60. However, the present disclosure is not limited to this configuration, and the thickness of the bent portion 66 may be the same as the thickness of other portions of the tube portion 60, or greater than the thickness of other portions of the tube portion 60, for example.

The configuration of the tube portion 60 according to the above-described embodiment is not particularly limited. For example, the shape of the tube portion 60 may be modified such that the diameter thereof increases or decreases in a direction from the flange portion 70 to the connection portion 61. Also, the shape of the tube portion 60 may be modified such that a portion thereof in the lengthwise direction has a bellows structure. The lips 61A of the tube portion 60 may be omitted.

The configuration of the flange portion 70 according to the above-described embodiment is not particularly limited. That is to say, the structure of the flange portion 70 is not particularly limited as long as the flange portion 70 has a structure that enables the flange portion 70 to elastically abut against the panel 100 in intimate contact therewith in a state where the grommet 50 is attached to the through hole 100X. For example, the flange portion 70 may be formed so as to protrude outward in a radial direction from portions, in the circumferential direction of the tube portions 60 and 80, of the outer circumferential surfaces of the tube portions 60 and 80.

The configuration of the tube portion 80 according to the above-described embodiment is not particularly limited. For example, the tube portion 80 may be formed so as to have a cylindrical shape in which both the outer circumferential surface and the inner circumferential surface are substantially even. Also, the shape of the tube portion 80 may be modified such that a portion thereof in the lengthwise direction has a bellows structure.

Although the grommet 50 according to the above-described embodiment has a cylindrical shape, the present disclosure is not limited to such a configuration. For example, the grommet 50 may be formed so as to have an ellipsoidal tubular shape, an oval tubular shape, or a rectangular tubular shape.

In the above-described embodiment, the corrugated tube 40 is fitted to an end portion of the tube portion 60. However, the exterior member that is fitted to an end portion of the tube portion 60 is not limited to the corrugated tube 40. For example, a pipe that is made of metal or a hard pipe that is made of resin may be fitted to an end portion of the tube portion 60.

Although not specifically referred to in the above-described embodiment, a configuration in which an electromagnetic shielding member is provided inside the exterior member 30 may be employed. The electromagnetic shielding member is provided so as to enclose the plurality of electrical wires 20 all at once, for example. The electromagnetic shielding member is provided between the inner circumferential surface of the exterior member 30 and the outer circumferential surface of the electrical wires 20, for example. A flexible braided wire or metal foil may be used as the electromagnetic shielding member, for example. Also, a braided wire that is constituted by a plurality of metal strands, or a braided wire constituted by a combination of a metal strand and a resin strand may be used as the aforementioned braided wire. A reinforced fiber with excellent insulation properties and shear resistance, such as a para-aramid fiber, can be used as a resin strand, for example.

In the above-described embodiment, two electrical wires 20 are inserted into the exterior member 30. However, the number of electrical wires 20 is not particularly limited, and may be changed according to the specifications of the vehicle. For example, one electrical wire, or three or more electrical wires may be inserted into the exterior member 30. For example, it is possible to employ a configuration in which a low-voltage electrical wire that connects a low-voltage battery and various low-voltage devices (such as a lamp, a car audio, and so on) to each other is added as an electrical wire that is inserted into the exterior member 30. Also, only low-voltage electrical wires may be employed.

The positional relationship between the inverter 11 and the high-voltage battery 12 in a vehicle V is not limited to the above-described embodiment, may be modified according to the vehicle configuration.

Figure 9:
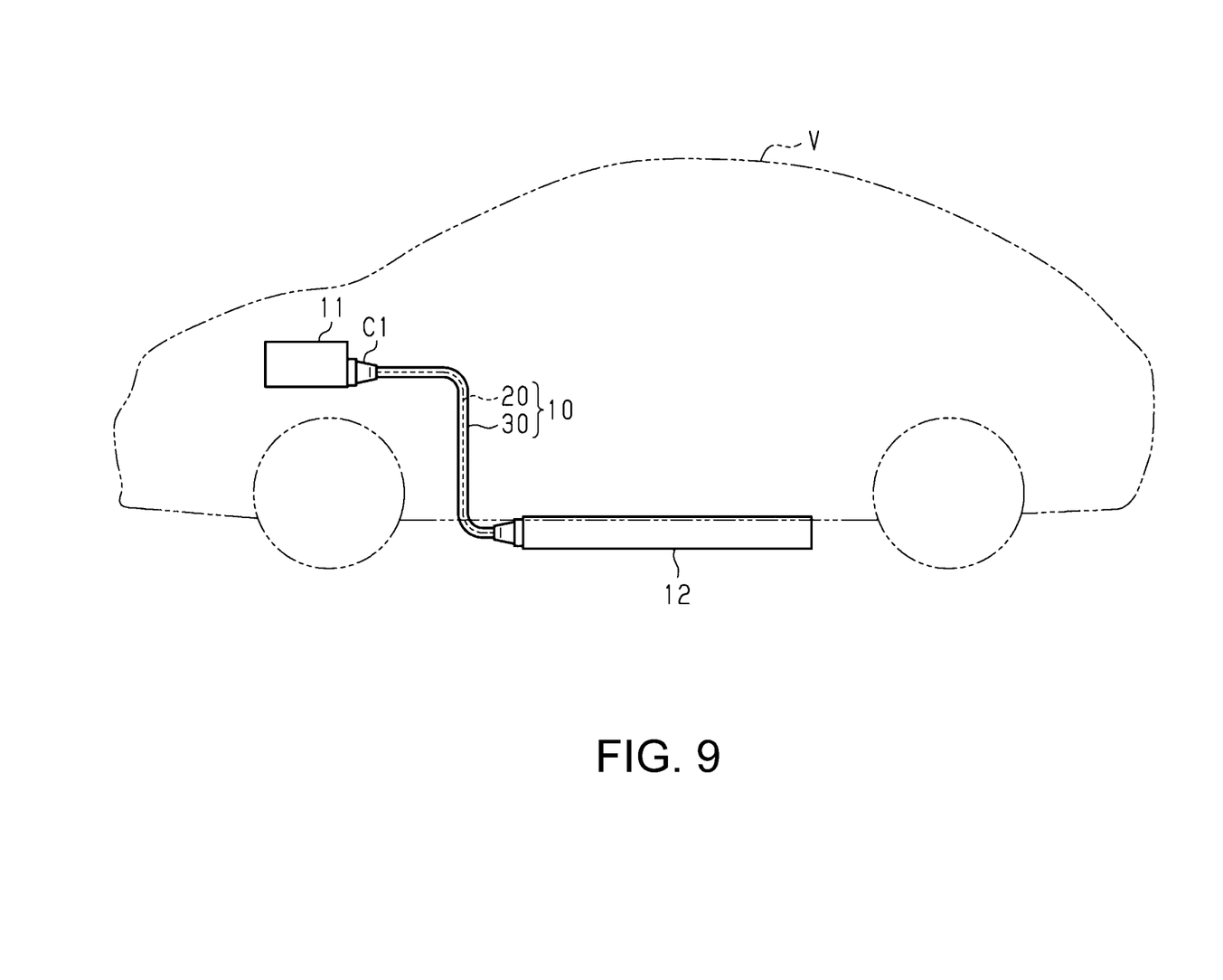
FIG. 9 is a schematic configuration diagram showing a wire harness according to a modified example.

For example, as shown in FIG. 9, the wire harness 10 may be embodied such that the high-voltage battery 12 is located along substantially the entire floor of the vehicle V, and the wire harness 10 electrically connects the high-voltage battery 12 and the inverter 11 to each other.

In the above-described embodiment, the inverter 11 and the high-voltage battery 12 are employed as electric devices that are connected to the wire harness 10. However, the present disclosure is not limited to such a configuration. For example, the present disclosure may be applied to electrical wires that connect the inverter 11 and a motor for driving the wheels. That is to say, the present disclosure is applicable to any subject that electrically connects electrical devices on a vehicle to each other.

What is claimed is:
1. A grommet comprising:
a tube; and
a flange that has a greater diameter than the tube, the flange having an inner end that is located on an inner side in a radial direction and that is coupled to one end of the tube, wherein:
the inner end of the flange is formed so as to bulge outward in a radial direction relative to an outer circumferential surface of the tube, and has an outer surface that faces toward the tube and an inner circumferential surface that is located on an opposite side of the outer surface, and faces toward an internal space of the flange, and
a connection between the one end of the tube and the inner end of the flange is provided with a recess that is recessed in a direction from the outer surface of the inner end to the inner circumferential surface of the inner end,
wherein the recess has a non-uniform width dimension that gradually decreases from a bulge portion having a largest width of the recess toward the inner end of the flange.
2. The grommet according to claim 1,
wherein the one end of the tube includes a protrusion that protrudes further toward the inner circumferential surface of the inner end relative to the outer surface of the inner end, and a bend that is bent from a leading end of the protrusion toward the inner end, and
a space that forms the recess is formed between an outer circumferential surface of the protrusion and an outer circumferential surface of the bend.
3. The grommet according to claim 2,
wherein the bend is formed so as to have a smaller thickness than other portions of the tube.
4. The grommet according to claim 2,
wherein an inner circumferential surface of the bend is formed so as to protrude toward the internal space of the flange relative to an inner circumferential surface of a portion that is located at an innermost position of the inner end of the flange in a radial direction.

5. The grommet according to claim 2,
wherein the protrusion has different lengths at a first portion and a second portion that are located at different positions in a circumferential direction of the tube.

6. The grommet according to claim 5,
wherein the protrusion is longer at the first portion than at the second portion, and
the tube is bent in a direction that is displaced from the first portion by 180 degrees in the circumferential direction of the tube.

7. The grommet according to claim 1,
the recess is formed continuously along an entire circumference of the tube.

8. The grommet according to claim 1,
wherein, when the tube is referred to as a first tube,
the grommet comprises a second tube that is coupled to a first end that is opposite to a second end that is coupled to the first tube of the grommet,
the second tube has a bellows structure in which ring-shaped protrusions and ring-shaped recesses are continuously provided one after another in the lengthwise direction of the second tube, and a first incline that connects an end of the flange and a top of one of the ring-shaped protrusions to each other,
the bellows structure includes a second incline that extends from a bottom of the one of the ring-shaped recesses to a top of one of the ring-shaped protrusions, and
a connection between the end of the flange and the first incline is located outward of bottoms of the ring-shaped recesses in the radial direction of the second tube.

9. A wire harness comprising:
the grommet according to claim 8;
an electrical wire inserted into the grommet; and
a corrugated tube that is fitted to the first tube, wherein:
the corrugated tube has a bellows structure in which ring-shaped protrusions and ring-shaped recesses are continuously provided one after another in the lengthwise direction of the corrugated tube,
a curvature radius of the top of each ring-shaped protrusion of the second tube is smaller than a curvature radius of the top of each ring-shaped protrusion of the corrugated tube, and
a curvature radius of the bottom of each ring-shaped recess of the second tube is smaller than a curvature radius of the bottom of each ring-shaped recess of the corrugated tube.

10. A wire harness comprising:
the grommet according to claim 1;
a corrugated tube that is inserted into the grommet; and
an electrical wire that is inserted into the corrugated tube,
wherein the corrugated tube is led out from both ends of the grommet.

* * * * *